United States Patent
Inaba et al.

[11] Patent Number: 5,924,457
[45] Date of Patent: Jul. 20, 1999

[54] PIPE AND METHOD FOR PRODUCING THE SAME

[75] Inventors: Hiroyuki Inaba, Tokyo; Ryuji Yasuda, Kanagawa; Hideyuki Sasaki, Tokyo, all of Japan

[73] Assignee: Calsonic Corporation, Tokyo, Japan

[21] Appl. No.: 08/746,720

[22] Filed: Jan. 13, 1997

[30] Foreign Application Priority Data

Jun. 28, 1995 [JP] Japan .................................. 7-162462
Nov. 17, 1995 [JP] Japan .................................. 7-299675

[51] Int. Cl.$^6$ ....................................................... F16L 9/00
[52] U.S. Cl. .......................... 138/162; 138/38; 138/163; 138/166; 138/167; 138/169; 138/171
[58] Field of Search ............................... 138/156, 162, 138/163, 165, 166, 167, 168, 171, 169, 128, 151, 91, 38

[56] References Cited

U.S. PATENT DOCUMENTS

| | | | |
|---|---|---|---|
| 1,786,759 | 12/1930 | Lawson | 138/171 |
| 1,796,015 | 3/1931 | Francis et al. | 138/168 |
| 1,930,191 | 10/1933 | Bundy | 138/171 |
| 1,984,232 | 12/1934 | Peremi et al. | 138/165 |
| 2,067,801 | 1/1937 | Taylor | 138/171 |
| 2,198,415 | 4/1940 | Quarnstrom | 138/168 |
| 2,483,095 | 9/1949 | Ingels | 138/168 |
| 2,749,155 | 6/1956 | Kinghorn et al. | 138/156 |
| 4,190,105 | 2/1980 | Dankowski | 138/38 |
| 4,513,787 | 4/1985 | Hegler et al. | 138/166 |
| 5,038,830 | 8/1991 | Arnaud | 138/91 |
| 5,566,722 | 10/1996 | Bartholomew | 138/128 |

FOREIGN PATENT DOCUMENTS

| | | |
|---|---|---|
| 1 266 487 | 3/1972 | United Kingdom . |
| 1 302 433 | 1/1973 | United Kingdom . |
| 1 550 629 | 8/1979 | United Kingdom . |
| 2 244 015 | 11/1991 | United Kingdom . |

*Primary Examiner*—Denise L. Ferensic
*Assistant Examiner*—James F. Hook
*Attorney, Agent, or Firm*—Sughrue, Mion, Zinn Macpeak & Seas, PLLC

[57] ABSTRACT

In a pipe in which a plate material is formed into a cylindrical shape, and a one-side edge portion and the other-side edge portion are joined to each other to thereby form a pipe body, a fitting convex portion is integrally formed on the one-side edge portion of the pipe body, and a fitting concave portion is integrally formed in the other-side edge portion so that the fitting convex portion is fitted into the fitting concave portion. Further, a top end portion of the fitting concave portion is bent and received in a recess portion formed in the pipe body.

23 Claims, 9 Drawing Sheets

5,924,457

PIPE AND METHOD FOR PRODUCING THE SAME

BACKGROUND OF THE INVENTION

1. Field of the Invention

The present invention relates to a pipe produced by shaping a plate material to be cylindrical and joining one- and the other-side edge portions to each other, and a method for producing such a pipe.

2. Description of the Prior Art

Recently, in a heat exchanger for a condenser or the like, a tank body is made of an aluminum pipe member 13 as shown in FIG. 19.

Conventionally, such a pipe member is produced by shaping a plate member 11 into cylindrical and brazing a one-side edge portion 11a and the other-side edge portion 11b to each other as indicated by R in FIG. 16.

However, if such a conventional pipe member 13 is heated to a high temperature in a brazing furnace for brazing, the one-side edge portion 11a and the other-side edge portion 11b of respective half cylindrical portions of the pipe member 13 separate from each other with a point A as a hinge as shown in FIG. 17 since the strain occurred by press molding is released in the pipe member 13, so that it becomes difficult to braze the one-side edge portion 11a and the other-side edge portion 11b to each other surely.

Conventionally, therefore, the one-side edge portion 11a and the other-side edge portion 11b of the pipe member 13 are subjected to spot welding W at points at intervals in advance as shown in FIG. 18, before the one-side edge portion 11a and the other-side edge portion 11b are brazed to each other.

However, there has been a problem with such a conventional producing method that a large number of steps are required in producing the pipe member 13 since the one-side edge portion 11a and the other-side edge portion 11b of the pipe member 13 are necessary to subjected to spot welding W at points at intervals in advance.

SUMMARY OF THE INVENTION

An object of the present invention is to solve the above mentioned problem and to provide a pipe and a method for producing the pipe in which both side edge portions can be made to abut each other surely at a predetermined position without performing spot welding or the like.

According to a first aspect of the invention, there is provided a pipe comprising: a pipe body formed by shaping a plate material to be cylindrical; a fitting convex portion integrally formed on a first-side edge portion of the pipe body; and a fitting concave portion integrally formed on a second-side edge portion of the pipe body; wherein the fitting convex portion is fitted into the fitting concave portion so as to join the first- and second- side edge portions each other and form the pipe.

According to a second aspect of the invention, there is provided a method for producing a pipe comprising the steps of: molding a pair of half cylindrical portions in parallel to each other through a connecting portion; forming a fitting convex portion and a recess portion at a first edge side of a first cylindrical portion; forming a hook portion at a second edge side of a second cylindrical portion at a corresponding position of the fitting convex portion and recess portion; making the connecting portion project from an inside thereof so as to make the pair of half cylindrical portions face; making the facing pair of half cylindrical portions abut on each other; and bending the hook portion along an outside of the fitting convex portion so as to fit the fitting concave portion to the fitting convex portion and recess portion.

DETAILED DESCRIPTION OF THE PREFERRED EMBODIMENTS

The present invention will be described below in detail by using the drawings.

Figure 1:
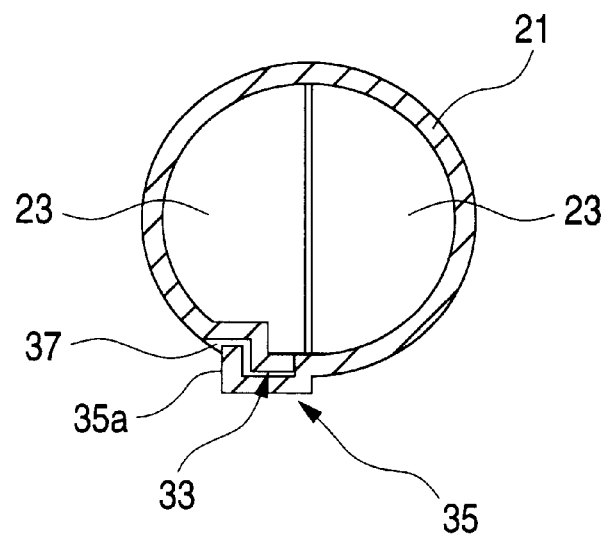
FIG. 1 is a sectional view of a fitting portion of the pipe according to a first embodiment of the present invention.
Figure 2:
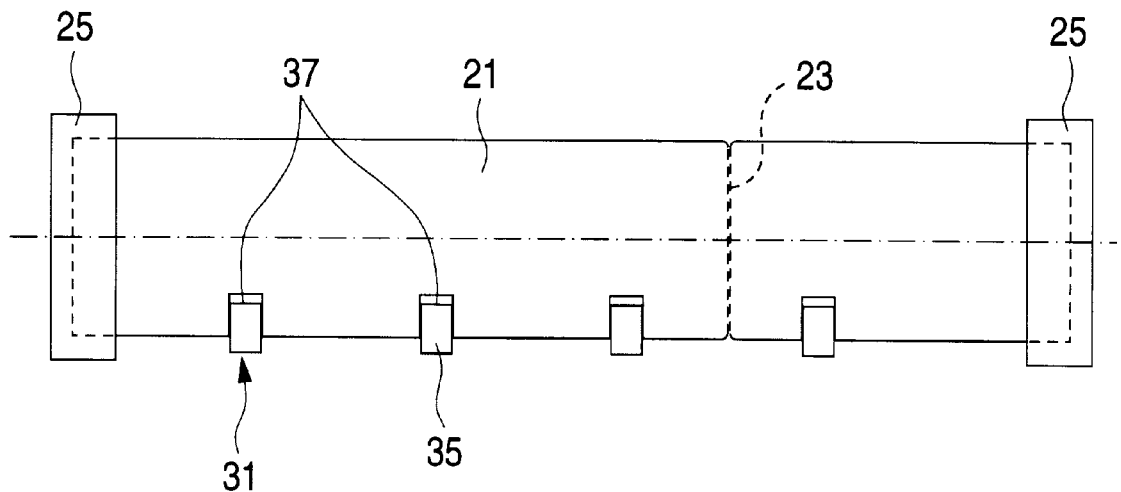
FIG. 2 is a side view of the pipe shown in FIG. 1.
Figure 3:
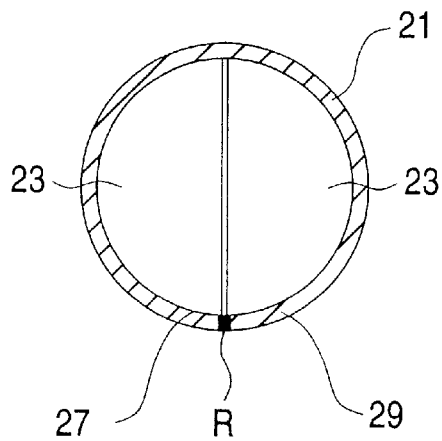
FIG. 3 is a side view of parts other than the fitting portion of the pipe shown in FIG. 2.

FIGS. 1 to 3 show a first embodiment of the pipe of the present invention. The pipe is used as a tank of a heat exchanger for a condenser or the like, and a partition portion 23 for partitioning a path for a refrigerant is formed on one side of a pipe body 21 made of aluminum.

The pipe body 21 is cylindrical and patch ends 25 made of aluminum are fitted and brazed on the opposite ends of the pipe body 21.

A one-side edge portion 27 and the other-side edge portion 29 of the pipe body 21 are brazed (R) to each other as shown in FIG. 3.

Further, a plurality of fitting portions 31 are formed at intervals in the axial direction of the pipe body 21 as shown in FIG. 2.

Each of the fitting portions 31 is constituted by a fitting convex portion 33 integrally formed on the one-side edge portion 27 of the pipe body 21 and a fitting concave portion 35 integrally formed in the other-side edge portion 29 of the pipe body 21 as shown in FIG. 1.

Further, a top end 35a of the fitting concave portion 35 is received in a recess portion 37 formed in the pipe body 21.

The pipe mentioned above is produced in such a manner as described below.

Figure 4:
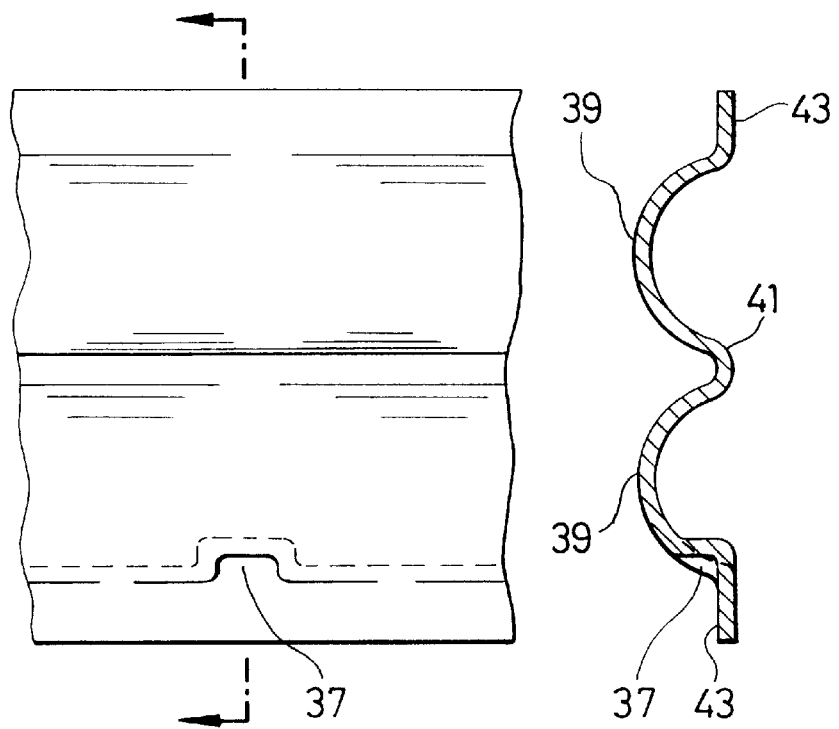
FIG. 4 is an explanatory view showing a molding step for producing the pipe of the first embodiment of the present invention.

First, a flat plate made of aluminum is molded into a pair of semicircular half cylindrical portions 39 in a molding step shown in FIG. 4.

The pair of half cylindrical portions 39 are formed so as to be parallel to each other through a connecting portion 41 in a shape of an arc.

Further, at the same time, outward projecting flat portions 43 are formed on the respective edges of the pair of half cylindrical portions 39.

Furthermore, at the same time, the recess portion 37 is formed at the edge side of one of the half cylindrical portions 39.

In the molding step mentioned above, the flat plate is put between given metal molds so as to be subjected to press molding.

Figure 5:
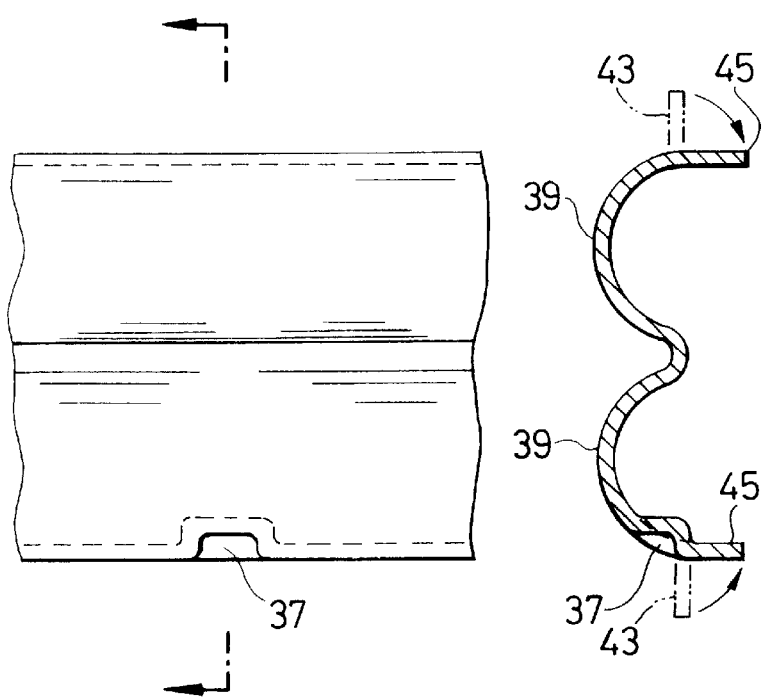
FIG. 5 is an explanatory view showing a bending step for producing the pipe of the first embodiment of the present invention.

Next, in a bending step shown in FIG. 5, the flat portions 43 are bent in the opening direction of the half cylindrical portions 39 so as to form flange portions 45.

Figure 6:
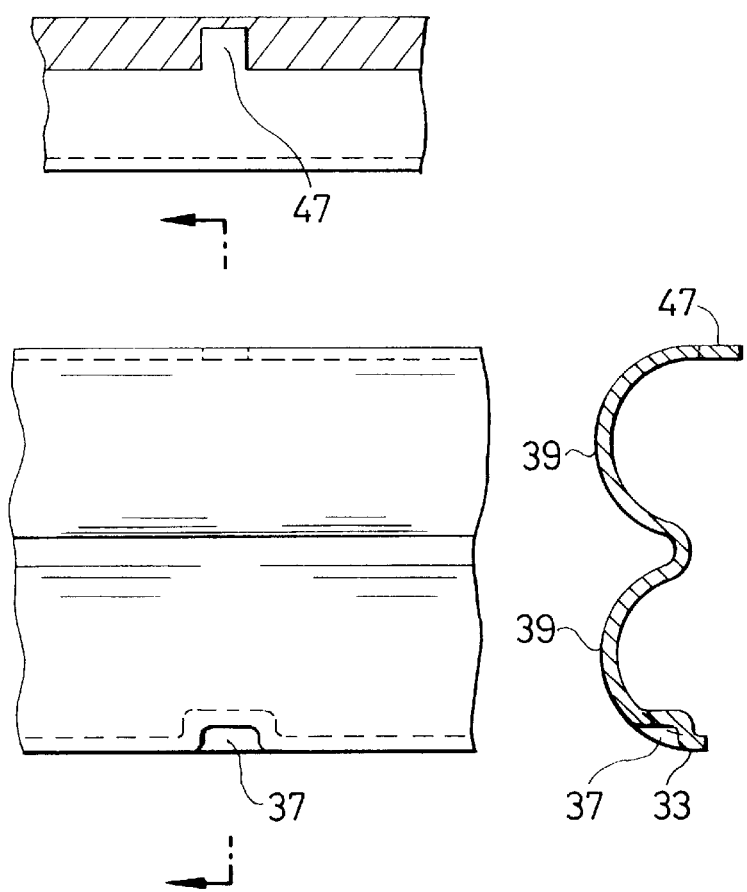
FIG. 6 is an explanatory view showing a cutting step for producing the pipe of the first embodiment of the present invention.

Then, in a cutting step shown in FIG. 6, parts other than a part corresponding to the recess portion 37, that is, parts which are hatched in FIG. 6, of the flange portions 45 at an opposite side of the recess portion 37 are cut off so as to form the fitting convex portion 33 on the recess portion 37 side.

Further, the fitting-concave-portion forming portion 47 is formed on the side opposite to the recess portion 37.

In this cutting step, trimming is conducted by a press machine.

Figure 7:
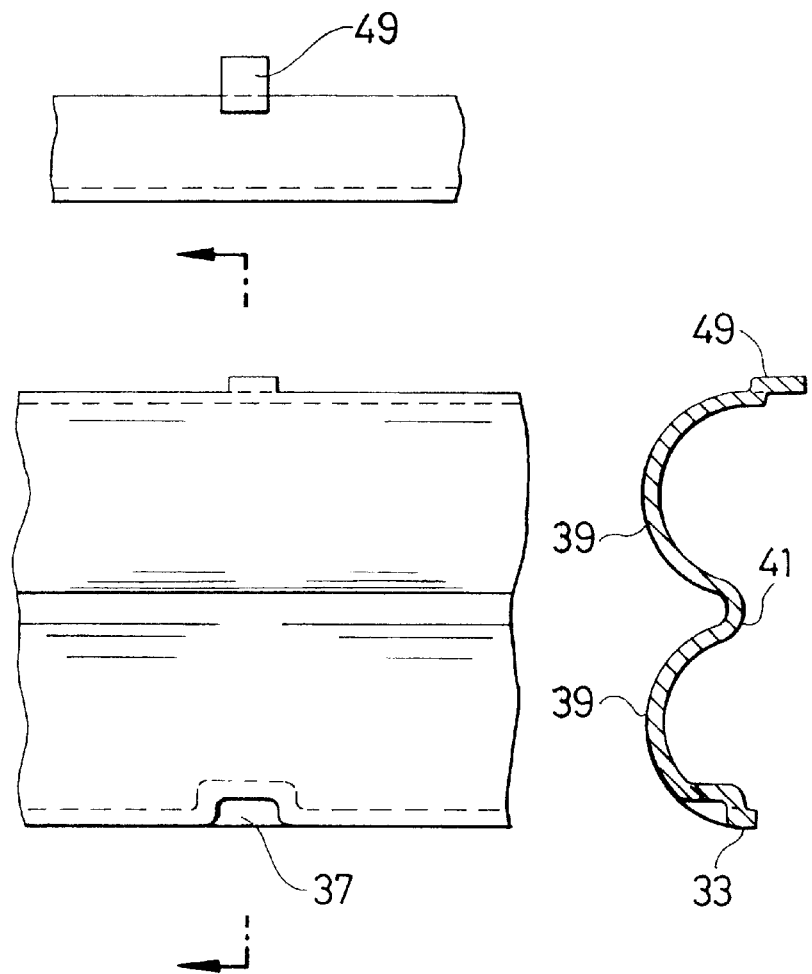
FIG. 7 is an explanatory view showing a hook portion molding step for producing the pipe of the first embodiment of the present invention.

Next, in a hook portion molding step shown in FIG. 7, the fitting-concave-portion forming portion 47 is pushed outside to an extent corresponding to the plate thickness so as to form a hook portion 49.

Figure 8:
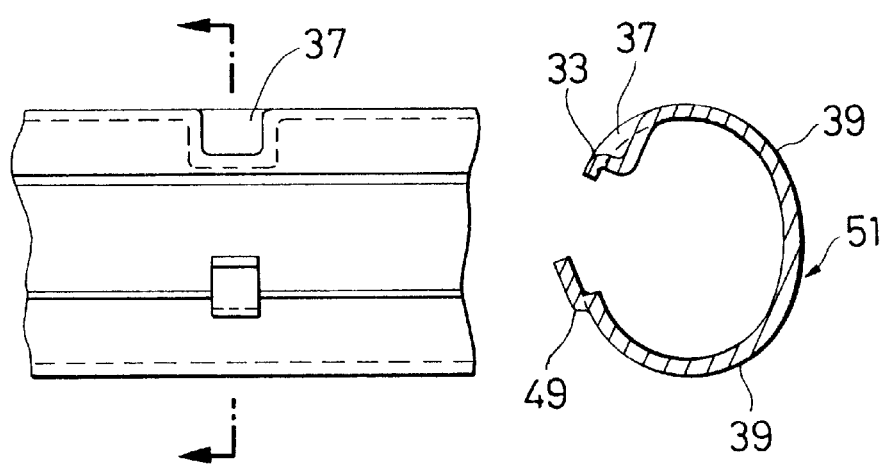
FIG. 8 is an explanatory view showing a facing step for producing the pipe of the first embodiment of the present invention.

Then, in a facing step shown in FIG. 8, the connecting portion 41 is pushed out from the inside so as to make the pair of half cylindrical portions 39 substantially face each other.

In this facing step, the half cylindrical portions 39 are received in a metal mold (not illustrated), and the connecting portion 41 is pushed with a punch against an arc portion of the metal mold.

Figure 9:
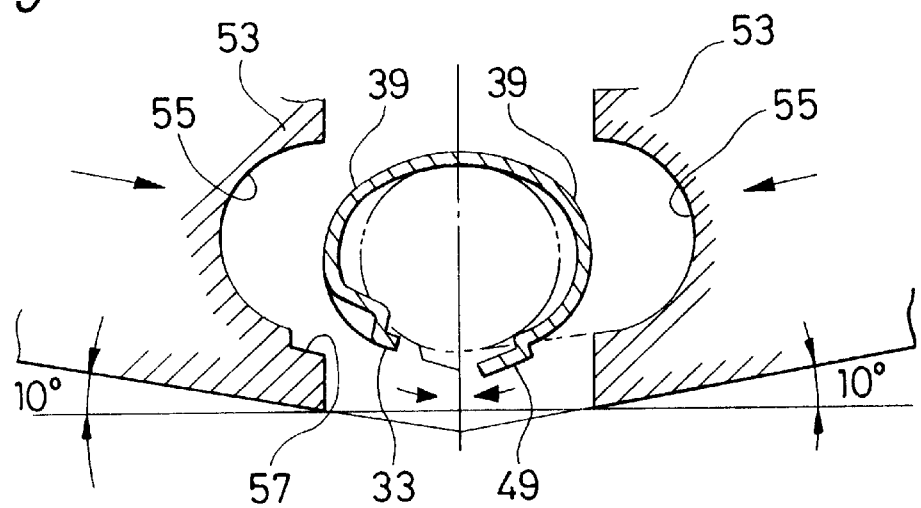
FIG. 9 is an explanatory view showing a curling step for producing the pipe of the first embodiment of the present invention.

Finally, in a curling step shown in FIG. 9, the pair of half cylindrical portions 39 substantially facing each other are made to abut each other, and at the same time, the hook portion 49 is bent along the outside of the fitting convex portion 33 so as to be shaped as the fitting concave portion 35, so that the fitting concave portion 35 is fitted to the fitting convex portion 33 and the recess portion 37.

In this curling step, a pipe member 51 formed as shown in FIG. 8 is received in metal molds 53 disposed to face each other, and the metal molds 53 are moved.

A semicircular arch portion 55 is formed on each of the metal molds 53, and a curling portion 57 is formed at an edge of one of the metal molds 53.

For curling, both the metal molds 53 are moved as indicated by arrows in FIG. 9 at angles of, for example, 10 degrees.

Figure 10:
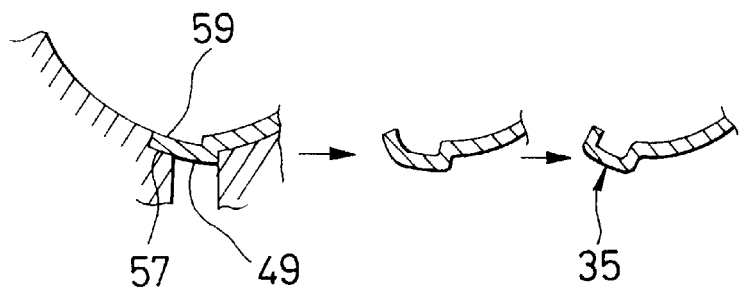
FIG. 10 is an explanatory view showing the state in which a hook portion is bent in FIG. 9.

In other words, as shown in FIG. 10, after the top end of the hook portion 49 is touched to a wall portion 59 of the curling portion 57, the metal molds 53 are closed so that the hook portion 49 is curled along the fitting convex portion 33, and the fitting concave portion 35 is fitted to the fitting convex portion 33.

Then, in a brazing step, the one-side edge portion 27 and the other-side edge portion 29 are brazed to each other, and the fitting convex portion 33 and the fitting concave portion 35 are brazed to each other.

In this brazing step, brazing is conducted in a manner so that, for example, a noncorrosive flux is applied to portions to be brazed and the portions to be brazed are heated in a nitrogen atmosphere.

In such a pipe produced as described above, if the fitting convex portion 33 integrally formed on the one-side edge portion 27 of the pipe body 21 is fitted in the fitting concave portion 35 which is integrally formed in the other-side edge portion 29 of the pipe body 21, the one-side edge portion 27 and the other-side edge portion 29 are made to abut surely each other at a predetermined position. Thus, the one-side edge portion 27 and the other-side edge portion 29 can abut surely each other in position without being subjected to spot welding.

Furthermore, since the top end of the fitting concave portion 35 is received in the recess portion 37 formed in the pipe body 21, the top end of the fitting concave portion 35 does not project from the pipe. Thus, pipes having no obstructive projections can be obtained.

In addition, as for the pipe mentioned above, by fitting the fitting convex portion 33 and the fitting concave portion 35 to each other, the one-side edge portion 27 and the other-side edge portion 29 are made to abut each other surely at a predetermined position. Since this state of abutment is kept even at a high temperature, the one-side edge portion 27 and the other-side edge portion 29 are surely brazed to each other and the fitting convex portion 33 and the fitting concave portion 35 are surely brazed to each other.

Further, in the pipe producing method mentioned above, when the pair of half cylindrical portions 39 substantially facing each other are made to abut each other, the hook portion 49 is bent along the outside of the fitting convex portion 33 and the top end of the hook portion 49 is positioned within the recess portion 37. As a result, it is possible to easily and surely produce such a pipe in which the top end of the fitting concave portion 35 is received in the recess portion 37 formed in the pipe body 21.

Figure 11:
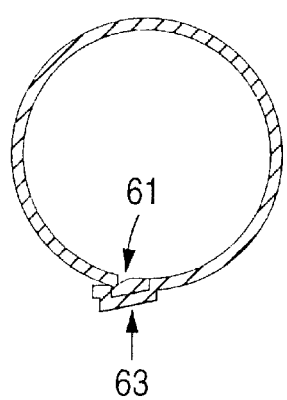
FIG. 11 is a sectional view to show the pipe according to a second embodiment of the present invention.

FIG. 11 shows a second embodiment of the pipe according to the present invention. In this embodiment, a fitting convex portion 61 is formed in a shape of a hook and fitted into a fitting concave portion 63 in a state in which the fitting convex portion 61 is elastically deformed.

This second embodiment has substantially the same effects as the first embodiment. In the second embodiment, since the fitting convex portion 61 is fitted into the fitting concave portion 63 in a state where it is elastically deformed, fitting strength can be increased.

Figure 12:
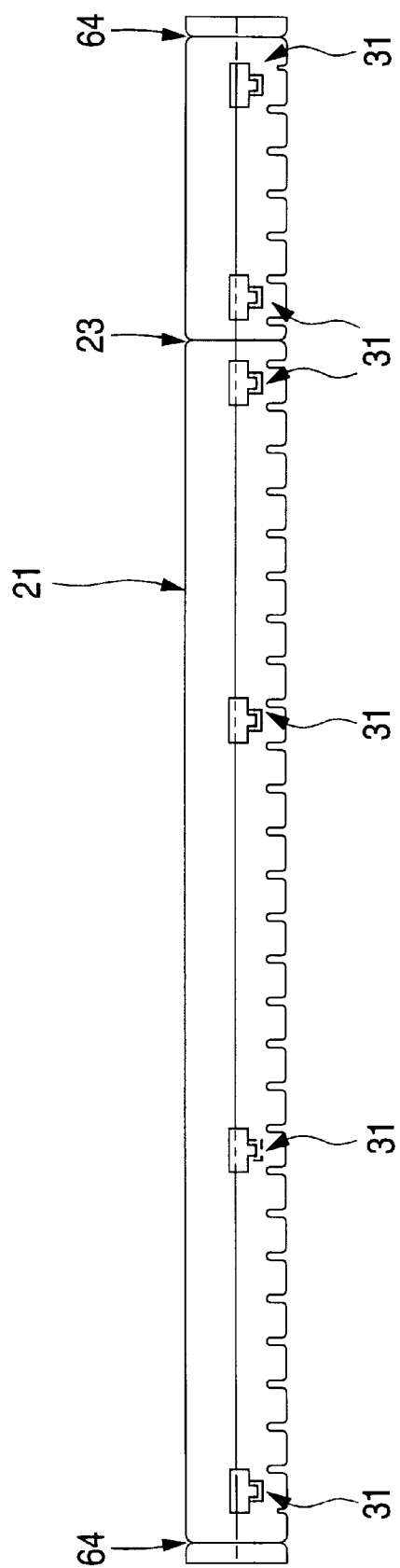
FIG. 12 is a side view showing the pipe according to a third embodiment of the present invention.
Figure 13:
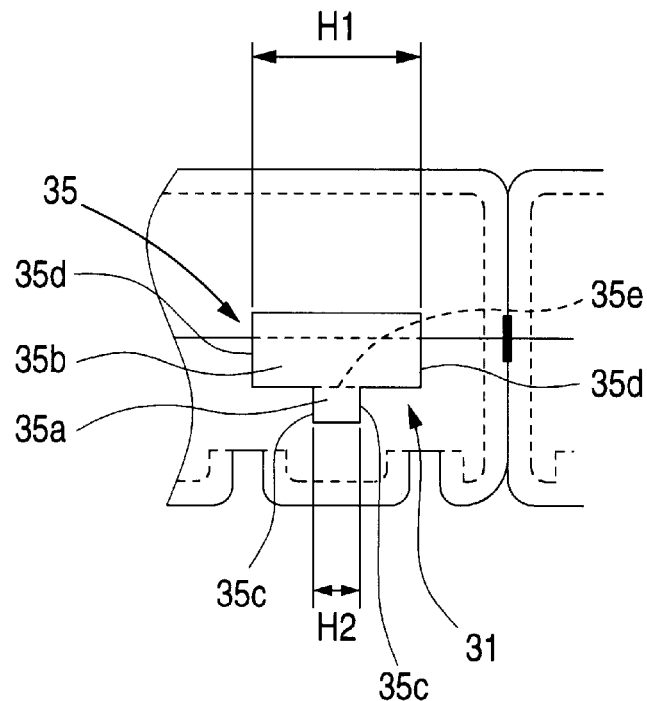
FIG. 13 is an enlarged side view showing the fitting portion of the pipe of FIG. 12.

FIGS. 12 and 13 show a third embodiment of the pipe according to the present invention. This pipe body 21 is cylindrical, and closing portions 64 are formed at the both ends of the pipe body 21. The parts or elements to be common with the pipe body 21 of the first embodiment will be designated by the same reference numeral as those of the fitst embodiment, and the detailed description will be omitted.

FIG. 13 shows the fitting portion 31 in enlargement. In this embodiment, the axial width H1 of a side surface portion 35b of the fitting concave portion 35 is set to be larger than the axial width H2 of the top end portion 35a.

Further, the top end portion 35a is formed at a center of the side surface portion 35b and opposite edges 35c of the top end portion 35a are formed in positions separated from opposite edges 35d of the side surface portion 35b.

In the thus configured pipe, since the axial width H1 of the side surface portion 35b of the fitting concave portion 35 is set to be larger than the axial width H2 of the top end portion 35a, the rigidity of the top end portion 35a becomes sufficiently smaller than the rigidity of the side surface portion 35b.

Since the opposite edges 35c of the top end portion 35a are formed in positions separated from the opposite edges 35d of the side surface portion 35b, the strength of the opposite edges 35c of the top end portion 35a at its joint portion 35e to the side surface portion 35b becomes weak so that the top end portion 35a is bent into a predetermined shape from the joint portion 35e conjointly with the fact that the rigidity of the top end portion 35a is smaller than the rigidity of the side surface portion 35b.

Accordingly, the top end portion 35a can be bent into a predetermined shape easily and surely.

Figure 14:
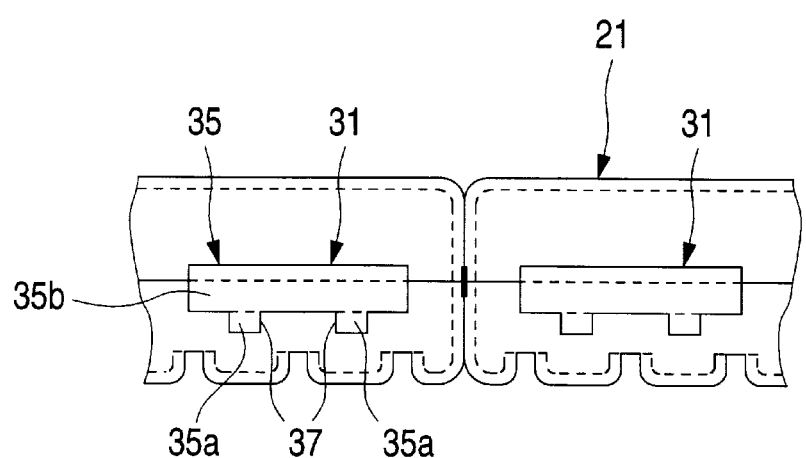
FIG. 14 is a side view showing a fitting portion of the pipe according to a fourth embodiment of the present invention.

FIG. 14 shows a fourth embodiment of the pipe according to the present invention. In a fitting portion 31 in this embodiment, the width of a side surface portion 35b of a fitting concave portion 35 is made larger and a pair of top end portions 35a are formed at a predetermined interval on the side surface portion 35b.

On the other hand, recess portions 37 are formed in a one-side edge portion 27 in positions corresponding to the pair of top end portions 35a and the top end portions 35a are bent toward the recess portions 37 respectively.

In this embodiment, since a pair of top end portions 35a are formed on the side surface portion 35b of the fitting concave portion 35 in the fitting portion 31 and these top end portions 35b are bent toward the recess portions 37 formed in the one-side edge portion 27 of the pipe body 21 respectively, the one-side edge portion 27 is connected to the other-side edge portion 29 more firmly.

Figure 15:
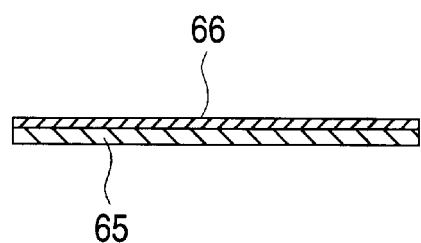
FIG. 15 is an explanatory view showing a plate material for forming the pipe body.
Figure 16:
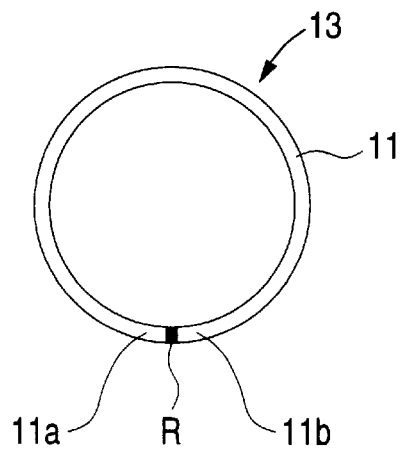
FIG. 16 is an explanatory view showing a conventional pipe.
Figure 17:
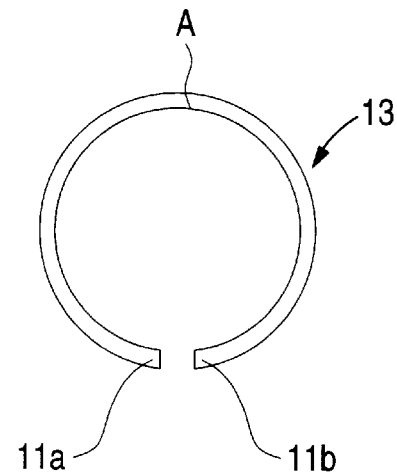
FIG. 17 is an explanatory view showing the state in which the pipe is open.
Figure 18:
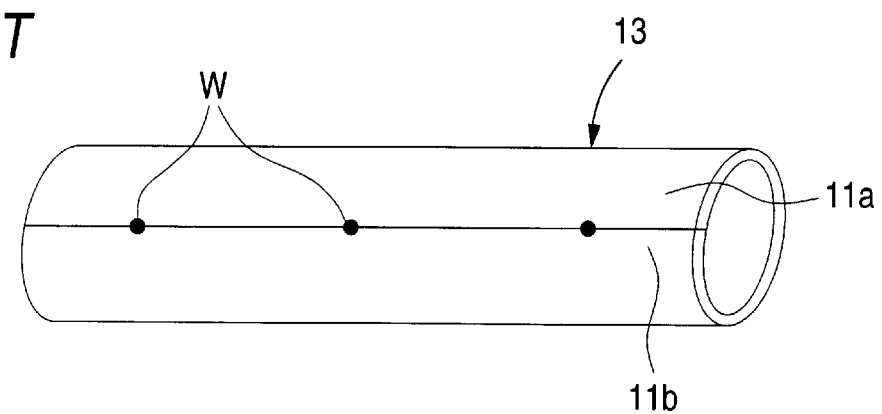
FIG. 18 is an explanatory view showing the state in which the pipe is spot-welded.
Figure 19:
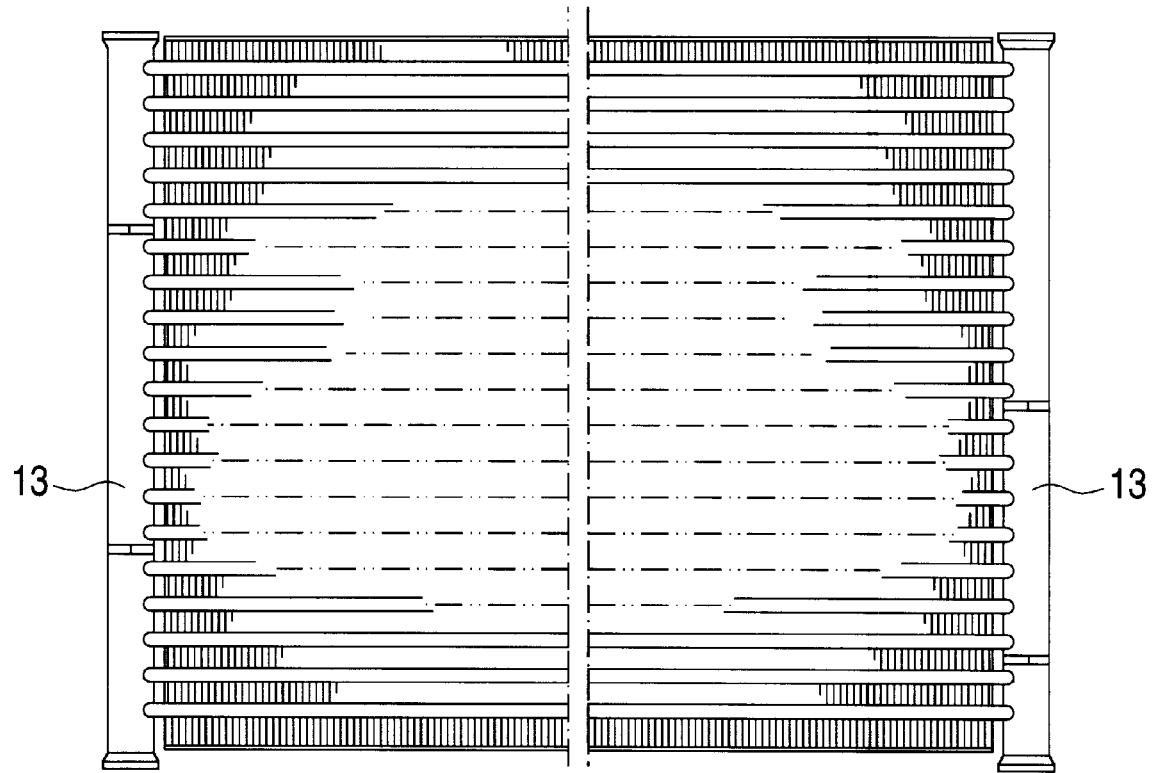
FIG. 19 is a front view of a heat exchanger to which the pipe member according to the present application is applied.

As shown in FIG. 15, a plate material 65 for forming the pipe body 21 can be also made of an aluminum clad material and a brazing layer 66 may be formed on a surface which will be made to be outside.

Further, although the case in which the partition portion 23 is formed on the pipe body 21 is described in detail in the embodiments mentioned above, the present invention is not limited to these embodiments, but, of course, it is also possible to form the pipe body 21 with no partition portion 23.

Furthermore, although the case in which the one-side edge portion 27 and the other-side edge portion 29 are brazed to each other and the fitting convex portion 33 and the fitting concave portion 35 are brazed to each other is described in the embodiments explained above, the present invention is not limited to these embodiments, but, for example, the one-side edge portion 27 and the other-side edge portion 29 may be joined to each other by welding, and the fitting convex portion 33 and the fitting concave portion 35 may be joined to each other by welding.

As described above, in the pipe according to the present invention, when the fitting convex portion integrally formed on the one-side edge portion of the pipe body is fitted into the fitting concave portion integrally formed in the other-side edge portion of the pipe body, the one-side edge portion and the other-side edge portion are made to abut each other surely at a predetermined position. As a result, the one-side edge portion and the other-side edge portion can be made to abut each other surely at a predetermined position without conducting spot welding or the like.

When the top end of the fitting concave portion is received in the recess portion formed in the pipe body, the top end of the fitting concave portion does not project from the pipe body so that the pipe with no obstructive projections can be obtained.

When the fitting convex portion and the fitting concave portion are fitted to each other so that the one-side edge portion and the other-side edge portion are made to abut each other surely at a predetermined position, and this state of abutment is kept even at a high temperature. As a result, it is possible to surely braze the one-side edge portion and the other-side edge portion to each other and to surely braze the fitting convex portion and the fitting concave portion to each other.

Further, when the axial width of the side surface portion of the fitting concave portion is made to be larger than the axial width of the top end portion, the top end portion can be bent into a predetermined shape easily and surely.

Furthermore, when a plurality of top end portions are formed at axial intervals on the side surface portion of the fitting concave portion and these top end portions are bent toward recess portions formed in the one-side edge portion of the pipe body, the one-side edge portion and the other-side edge portion can be connected to each other more firmly.

In the pipe producing method according to the present invention, when the pair of half cylindrical portions substantially facing each other are made to abut each other, the hook portion is bent along the outside of the fitting convex portion, and the top end of the hook portion is positioned in the recess portion. As a result, it is possible to easily and surely produce the pipe in which the top end of the fitting concave portion is received in the recess portion formed in the pipe body.

What is claimed is:

1. A pipe comprising:
    a cylindrical pipe body formed from a plate material;
    a fitting convex portion integrally formed on a first-side edge portion of said pipe body, and made of a first segment, a second segment extending from said first segment, and a third segment extending from said second segment, wherein said segments are arranged such that the length of said third segment does not overlap the length of said first segment around the circumference of the pipe; and
    a fitting concave portion integrally formed on a second-side edge portion of said pipe body;
    wherein said fitting convex portion is fitted into said fitting concave portion so as to join said first-side edge and second-side edge portions to each other and form said pipe.

2. The pipe according to claim 1, wherein a top end of said fitting concave portion is received in a recess portion formed in said pipe body.

3. The pipe according to claim 2, wherein said fitting concave portion comprises a side surface portion formed in a base portion of said fitting concave portion and a top end portion formed in said top end of said fitting concave portion, wherein a width in a pipe axial direction of said side surface portion is greater than a width in the pipe axial direction of said top end portion.

4. The pipe according to claim 3, wherein a plurality of top end portions are formed in the pipe axial direction on said side surface portion of said fitting concave portion and a plurality of recess portions are formed in said first-side edge portion of said pipe body in positions corresponding to said plurality of top end portions, and each of said top end portions is bent so as to be received in one of said recess portions.

5. The pipe according to claim 1, wherein said plate material is made of aluminum.

6. The pipe according to claim 1, wherein said plate material is made of an aluminum clad material and a brazing layer formed on said aluminum clad material.

7. The pipe according to claim 1, wherein said first-side edge portion and said second-side edge portion are brazed to each other; and said fitting convex portion and said fitting concave portion are brazed to each other.

8. The pipe according to claim 1, wherein said fitting convex portion is fitted into said fitting concave portion from an inside of said pipe body.

9. The pipe according to claim 1, further comprising a partition portion, formed in said pipe body, for partitioning a path for a refrigerant.

10. The pipe according to claim 1, further comprising closing portions formed at both ends of said pipe body.

11. The pipe according to claim 1, wherein said fitting convex portion is formed in the shape of a hook and fitted into said fitting concave portion while being elastically deformed.

12. The pipe according to claim 1, wherein said fitting convex portion is formed so that its first segment is perpendicular to its second segment and its second segment is perpendicular to its third segment.

13. The pipe according to claim 1, wherein said fitting concave portion is formed of a first section extending from said pipe second-side edge portion, a second section extending from said first section, and a third section extending from said second section, wherein said third section forms an abutting face that is substantially perpendicular to said second section.

14. The pipe according to claim 13, wherein said abutting face abuts with said second segment.

15. The pipe according to claim 13, wherein said first section is substantially perpendicular to said second section.

16. The pipe according to claim 15, wherein said third section is longer than said first section.

17. The pipe according to claim 1, further comprising a plurality of discrete fitting convex portions and a plurality of discrete fitting concave portions.

18. The pipe according to claim 1, wherein said first and said third segments extend from said second segment in directions which are opposite to one another.

19. A method for producing a pipe comprising the steps of:

molding a pair of half cylindrical portions in parallel to each other through a connecting portion;

forming a fitting convex portion and a recess portion at a first edge side of a first half cylindrical portion;

forming a hook portion at a second edge side of a second half cylindrical portion at a corresponding position of the fitting convex portion and recess portion;

making the connecting portion project from an inside thereof so as to make the pair of half cylindrical portions face;

making the facing pair of half cylindrical portions abut each other; and bending the hook portion along an outside of the fitting convex portion so as to fit the hook portion to the fitting convex portion and recess portion.

20. The method for producing a pipe according to claim 19, wherein the pair of half cylindrical portions is molded from a flat plate made of aluminum.

21. The method for producing a pipe according to claim 19, wherein the hook portion forming step comprises the steps of:

forming an outward projecting flat portion at the second edge side of the second half cylindrical portion; and cutting a portion of the outward projecting flat portion so as to form a fitting-concave-portion forming portion; and pushing the fitting-concave-portion forming portion outside to an extent corresponding to a plate thickness.

22. The method for producing a pipe according to claim 19, further comprising the step of brazing the first edge side and second edge side to each other, and the fitting convex portion and fitting concave portion to each other.

23. The method for producing a pipe according to claim 19, further comprising making said pipe of a plate having a plate-thickness, and wherein said step of forming a hook portion includes forming a first portion pushed to the outside of said second edge side of said second half cylinder portion to an extent corresponding to said plate-thickness.

* * * * *

UNITED STATES PATENT AND TRADEMARK OFFICE
CERTIFICATE OF CORRECTION

PATENT NO.    : 5,924,457                                                    Page 1 of 1
DATED         : July 20, 1999
INVENTOR(S)   : Hiroyuki Inaba, Ryuji Yasuda and Hideyuki Sasaki It is certified that error appears in the above-identified patent and that said Letters Patent is hereby corrected as shown below:

<u>Title page,</u>
Item [22], Filing Date: should be -- 11/15/96 -- not "1/13/97"
Item [30], Foreign Application Priority Data, delete "Japan HEI 7-162462  6/28/95"

Signed and Sealed this

Second Day of July, 2002

*Attest:*

JAMES E. ROGAN
*Attesting Officer*     Director of the United States Patent and Trademark Office